UNITED STATES PATENT OFFICE.

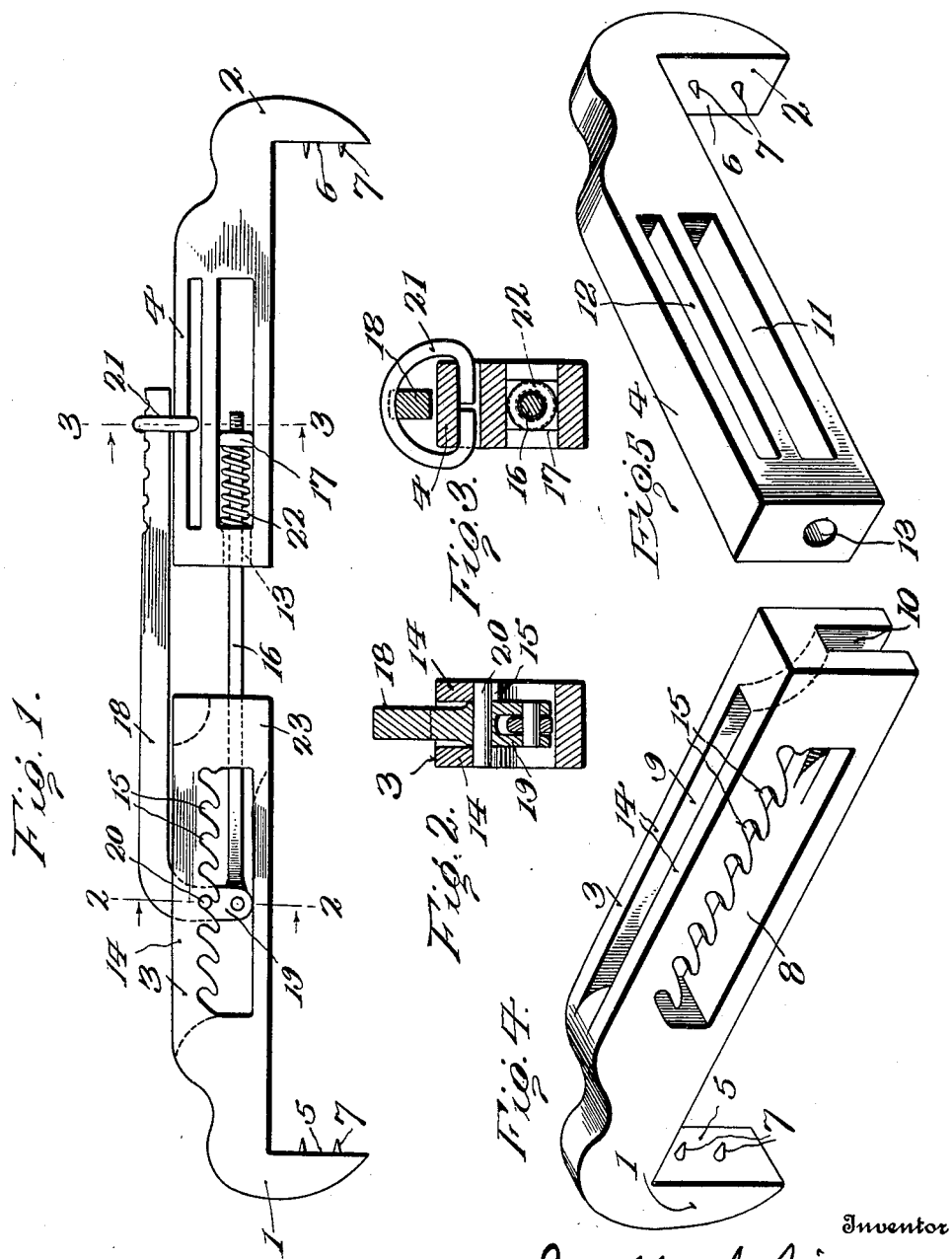

JOSEPH A. SIMON, OF MEMPHIS, TENNESSEE.

LUMBER-CLAMP.

1,189,397.      Specification of Letters Patent.      Patented July 4, 1916.

Application filed May 26, 1915. Serial No. 30,616.

*To all whom it may concern:*

Be it known that I, JOSEPH A. SIMON, a citizen of the United States, residing at Memphis, Shelby county, and State of Tennessee, have invented and discovered certain new and useful Improvements in Lumber-Clamps, of which the following is a specification.

The present invention relates to clamps and consists in the combinations and arrangements of parts hereinafter disclosed and particularly set forth in the accompanying claims.

The invention has for its special purpose to provide a clamp adapted to prevent the checking and splitting of lumber on the end in the course of drying, and embodies a positive adjusting means having a resilient element operable to allow of limited movement of the jaws after final setting.

A further purpose of the invention is to provide a clamp of this character having a lever locking element, with an adjustable fulcrum, to the end that the clamp jaws may be brought together with great force, and having extensive limits for its application.

The invention is shown by way of illustration in the accompanying drawings, in which, Figure 1 is a side elevational view of the clamp, Fig. 2 is a transverse sectional view taken on the line 2—2 thereof and looking in the direction of the arrows, Fig. 3 is a similar view taken on the line 3—3, and Figs. 4 and 5 are perspective views of the respective clamp jaws.

Referring to the construction in further detail, the clamp comprises a pair of jaws 1 and 2 having shank portions 3 and 4, respectively, and the active faces 5 and 6 of said jaws are provided each with a plurality of spurs or teeth 7 to act against slipping. The shank portion 3 of the jaw 1 is longitudinally cut away to provide a space 8 and the central slots 9 and 10, and in like manner the shank portion 4 of the jaw 2 is cut away to form the recesses 11 and 12 and the aperture 13 in the end wall thereof. The space 9 forms a pair of side bars 14 whose under edges are constructed after the manner of a rack to form a series of bearing points 15 for the fulcrum of the clamp adjusting lever and lock.

The clamp adjusting means comprises a rod 16 freely passing through the opening 13 of the shank portion 4 and having screw engagement with a threaded nut 17 that fits within the recess 11 and is held against turning movement therein. A lever 18 is pivotally connected at 19 to the free end of the rod 16 and said lever carries a fulcrum pin 20 adapted to engage within any corresponding pair of seats 15 on the rack, as will be understood. A ring 21 is slidably mounted in the slot 12 of the shank 4 and is designed to engage and lock said lever after the manner illustrated in Fig. 1. A spring 22 fits on the rod 16 between the threaded member 17 and the end of the shank, and has for its function to hold said jaws under strong resilient tension after final setting, though operable to permit of limited relative movement between said jaws.

The lower end portion 23 of the jaw shank 3 is cut away continuous with the slots 9 and 10, whereby to give sufficient clearness for manipulating the connecting rod 16 in applying and removing the clamp, or otherwise handling the same.

It will be evident from the foregoing that the clamp herein disclosed may be readily applied and the jaws thereof drawn together with great pressure, and that said jaws may have certain relative movement within limits after the same have been finally set.

It will be obvious that those skilled in the art may vary the details of construction and arrangement of parts without departing from the spirit of the invention, and therefore I do not wish to be limited to such features except as may be required by the claims.

Having thus described my said invention, what I claim as new and desire to secure by Letters Patent, is:

1. A clamp comprising a pair of jaws, a rod connecting said jaws, and a lever for said rod fulcrumed on one of said jaws and having locking engagement with the other jaw, substantially as set forth.

2. A clamp comprising a pair of jaws, a rod connecting said jaws, a lever carried by said rod adjustably fulcrumed on one of the jaws, and a device for locking the lever to the other jaw, substantially as set forth.

3. A clamp comprising a pair of jaws, a rod connecting said jaws, a lever carried by said rod adjustably fulcrumed on one of the jaws and adapted to engage with the other jaw, and a resilient element associated with said rod and lever operable to permit of limited relative movement between the jaws after setting, substantially as set forth.

4. A clamp comprising a pair of jaws, a rod connecting said jaws, a lever pivotally mounted on said rod and adjustably fulcrumed on one of said jaws, a device for locking the lever to the other jaw, and a resilient element disposed between said other jaw and the rod operable to permit of limited relative movement between the jaws after setting, substantially as set forth.

5. A clamp comprising a pair of jaws and one of said jaws constructed with a rack, a rod connecting the jaws, a lever fulcrumed on the jaw rack and engaging said rod, a device for locking the lever to the other jaw, and a resilient element disposed between said other jaw and the rod operable to permit of limited relative movement between the jaws after setting, substantially as set forth.

6. A clamp comprising a pair of jaws provided with recesses and one of said recess walls formed with a rack, a threaded member fitting in the recess of the other jaw, a rod having screw engagement at one end with said threaded member, a lever connected to said rod at the other end and fulcrumed on said rack, a device for locking the lever, and a spring on said rod between said threaded member and the jaw operable to permit of limited relative movement between the jaws after setting, substantially as set forth.

In witness whereof, I have hereunto set my hand and seal at Memphis, Tennessee this 12th day of May, A. D. nineteen hundred and fifteen.

JOSEPH A. SIMON. [L. S.]

Witnesses:
JOHN W. FARLEY,
J. P. O'CALLAGHAN.

Copies of this patent may be obtained for five cents each, by addressing the "Commissioner of Patents, Washington, D. C."